United States Patent [19]

Eguchi et al.

[11] 4,456,572

[45] Jun. 26, 1984

[54] METHOD FOR THE PREPARATION OF A FOAMED BODY OF A VINYL CHLORIDE-BASED RESIN COMPOSITION

[75] Inventors: Yoshitugu Eguchi; Osamu Matsumoto, both of Ibaraki; Kiyoshi Imada, Saitama, all of Japan

[73] Assignee: Shin-Etsu Chemical Co., Ltd., Tokyo, Japan

[21] Appl. No.: 441,945

[22] Filed: Nov. 15, 1982

[30] Foreign Application Priority Data

Nov. 16, 1981 [JP] Japan .............................. 56-183349
Nov. 19, 1981 [JP] Japan .............................. 56-185968

[51] Int. Cl.$^3$ ............................................. B29D 27/00
[52] U.S. Cl. .................. 264/53; 264/DIG. 5; 521/60; 521/79; 521/910
[58] Field of Search ............. 264/DIG. 5, 53; 521/60, 521/79, 910

[56] References Cited

U.S. PATENT DOCUMENTS

| | | | |
|---|---|---|---|
| 3,883,625 | 5/1975 | Thomas et al. | 264/DIG. 5 |
| 4,165,415 | 8/1979 | Adachi et al. | 264/DIG. 5 |
| 4,360,602 | 11/1982 | Nehmey et al. | 264/DIG. 5 |
| 4,370,286 | 1/1983 | Nehmey et al. | 264/DIG. 5 |
| 4,402,893 | 9/1983 | Kitamura et al. | 264/53 |

*Primary Examiner*—Philip E. Anderson
*Attorney, Agent, or Firm*—Toren, McGeady and Stanger

[57] ABSTRACT

The invention provides a novel method for the preparation of a foamed body of a vinyl chloride-based resin composition having a very fine and uniform cellular structure in a continuous process with outstandingly low costs. The method utilizes a binary volatilizable blowing agent composed of (i) a first volatilizable organic compound which is a halogenated or unhalogenated aliphatic hydrocarbon boiling at 90° C. or below and (ii) a second volatilizable organic compound selected from halogenated or unhalogenated aromatic hydrocarbons, ethers, ketones and esters having a specified solubility parameter in consideration of the compatibility with the vinyl chloride-based resin. The process is performed preferably by use of an extruder and the resin composition heated and at least partly melted in the cylinder of the extruder is impregnated with the volatilizable blowing agent pressurized into the cylinder so as to be uniformly distributed throughout the mass of the resin composition under kneading before the resin composition is extruded out of the extruder through the die.

12 Claims, No Drawings

METHOD FOR THE PREPARATION OF A FOAMED BODY OF A VINYL CHLORIDE-BASED RESIN COMPOSITION

BACKGROUND OF THE INVENTION

The present invention relates to a method for the preparation of a foamed body of a vinyl chloride-based resin composition or, more particularly, to an economical method for the continuous preparation of a foamed body of a vinyl chloride-based resin composition of high expansion having an outstandingly fine and uniform cellular structure in a continuous process.

In the prior art, several methods are known for the preparation of a foamed body of a vinyl chloride-based resin composition. For example, firstly, a vinyl chloride-based resin is admixed with a so-called decomposable blowing agent, which is a compound decomposable with heating to evolve a gaseous decomposition product, and the resin thus impregnated with the blowing agent is heated and shaped with simultaneous foaming by use of an extruder machine or injection machine. Secondly, a paste-like plastisol, which is a mixture of a vinyl chloride resin and a plasticizer, is foamed into a desired form by a mechanical means or foamed with simultaneous gelation of the resin composition by heating after admixing of a decomposable blowing agent. Thirdly, a resin composition containing a decomposable blowing agent is shaped into a desired form by a suitable means such as rolling at a temperature below the decomposition temperature of the blowing agent and then the thus shaped body is heated and foamed at a temperature sufficiently high for the decomposition of the blowing agent. Fourthly, a metal mold is filled with a mixture of a vinyl chloride resin and a decomposable blowing agent together with a volatilizable blowing agent, an organic solvent having a swelling power for the resin and a softening agent according to need, and the resin composition is melted and gelled in the metal mold by heating under pressure followed by solidification by cooling and the thus solidified resin composition is again heated to effect foaming under a reduced pressure.

Each of the above described methods, however, has its own disadvantages. For example, the first to the third methods above are not suitable for the preparation of a rigid or semi-rigid foamed body of high expansion. The fourth method is disadvantageous in the high costs for the preparation of the products because the method must be performed batch-wise and the process is rather complicated and lengthy taking a relatively long time.

The inventors have continued extensive investigations with an object to develop a method for the preparation of a foamed body of a vinyl chloride-based resin without the above mentioned problems and disadvantages in the prior art methods resulting in the development of an improved method disclosed in Japanese Patent Kokai 55-149328, according to which a resin composition obtained by formulating a vinyl chloride-based resin with a nucleating agent such as talc, an acrylic resin, a decomposable blowing agent such as an azodicarbonamide and the like together with a heat stabilizer is supplied to an extruder machine and the resin composition heated and gelled in the extruder machine is impregnated by pressurizing with a volatilizable blowing agent having a boiling point of 90° C. or below which is an aliphatic hydrocarbon or a halogenated aliphatic hydrocarbon, such as propane, butane, pentane, methyl chloride, trichlorofluoromethane, dichlorotetrafluoroethane and the like and then extruded out of the extruder machine to effect foaming under reduced pressure.

This method, unfortunately, still has several problems that (1) the impregnation of the resin composition by pressurizing with the volatilizable blowing agent must be performed under an extremely high pressure and uniform dispersion or dissolution of the blowing agent in the resin composition is obtained only by giving a strong mechanical shearing to the resin composition and/or by decreasing the melt viscosity of the resin composition with heating at an increased temperature, (2) a relatively long dispersion and mixing zone is required for the extruder machine in order to obtain sufficiently uniform impregnation of the resin composition with the volatilizable blowing agent, (3) the temperature of the resin composition impregnated with the volatilizable blowing agent in the dispersion and mixing zone of the extruder must be somewhat decreased before the resin composition is extruded out of the machine since the resin composition in the dispersion and mixing zone of the extruder is at an excessively high temperature not suitable for extrusion as such, and (4) the extruder machine accordingly must be a large one with an elaborate design. Therefore, a practical barrier is given due to these problems for the industrialization of the above proposed method.

SUMMARY OF THE INVENTION

It is therefore an object of the present invention to provide a novel and improved method for the preparation of a foamed body of a vinyl chloride-based resin composition of high expansion having an outstandingly fine and uniform cellular structure, according to which the problems in the prior art methods caused in connection with the difficulty in obtaining uniform dispersion of the volatilizable blowing agent in the resin composition can be solved.

Thus, the method of the present invention for the preparation of a foamed body of a vinyl chloride-based resin composition comprises
(a) heating a resin composition mainly composed of a vinyl chloride-based resin,
(b) impregnating the thus heated resin composition with a binary volatilizable blowing agent composed of
 (i) at least one kind of first volatilizable organic compounds selected from the group consisting of aliphatic hydrocarbons and halogenated aliphatic hydrocarbons having a boiling point not higher than 90° C., and
 (ii) at least one kind of second volatilizable organic compounds selected from the group consisting of aromatic hydrocarbons, halogenated aromatic hydrocarbons, ethers, ketones and esters having compatibility with the vinyl chloride-based resin, under pressurization,
(c) melting and mixing the resin composition to effect uniform dispersion of the blowing agent therein, and
(d) bringing the resin composition impregnated with the blowing agent under a reduced pressure so as to expand the composition by the volatilization of the blowing agent.

The above described steps (a) to (c) of the inventive method are preferably undertaken continuously in an extruder machine and the step (d) is performed by extruding the resin composition impregnated with the blowing agent out of the extruder through a die.

DETAILED DESCRIPTION OF THE PREFERRED EMBODIMENTS

According to the above described inventive method, the resin composition can very easily be impregnated with a necessary amount of the volatilizable blowing agent in uniform dispersion even under a very much reduced pressure and/or at a greatly decreased temperature in comparison with the pressure and/or temperature required in the prior art methods for the impregnation so that, as a consequence, a highly improved and inexpensive method is provided for the preparation of a foamed body of a vinyl chloride-based resin composition of high expansion having an outstandingly fine and uniform cellular structure in a continuous process.

As is understood from the above description of the inventive method, the most characteristic feature of the method is in the use of a binary volatilizable blowing agent composed of the components (i) and (ii).

The component (i) of the binary blowing agent is a volatilizable organic compound having a boiling point not higher than 90° C. selected from the group consisting of aliphatic hydrocarbons and halogenated aliphatic hydrocarbons. Exemplary of such organic compounds are propane, butane, isobutane, neopentane, n-hexane, isohexane, n-heptane, n-octane, n-decane and the like as the examples of the aliphatic hydrocarbons and methyl chloride, methylene chloride, chloroform, carbon tetrachloride, ethyl chloride, ethylidene chloride, trichloroethylene, 1,2-dichloroethane, trichlorofluoromethane, dichlorodifluoromethane, bromotrifluoromethane, tetrafluoromethane, dichlorofluoromethane, chlorotrifluoromethane, trifluoromethane, trichlorotrifluoroethane, dichlorotetrafluoroethane, dibromotetrafluoroethane, chloropentafluoroethane, hexafluoroethane, chlorodifluoroethane, difluoroethane and the like as the examples of the halogenated aliphatic hydrocarbons. These volatilizable compounds may of course be used either singly or as a combination of two kinds or more according to desire.

These volatilizable compounds as the component (i) of the volatilizable blowing agent in the inventive method have preferably a boiling point not higher than 90° C. since the foamed body after expansion may exhibit remarkable shrinkage not resulting in uniform cellular structure of the foamed body when the boiling point of these volatilizable organic compounds is higher than 90° C. More preferably, the boiling point of them should be not higher than 70° C.

The other component (ii) combined with the above described component (i) to form the binary volatilizable blowing agent in the inventive method is an organic compound belonging to the classes of aromatic hydrocarbons, halogenated aromatic hydrocarbons, ethers, ketones and esters. These compounds should have a boiling point not higher than 200° C. or, preferably, not higher than 150° C. Furthermore, these compounds should also have a compatibility with the vinyl chloride-based resin, for which the value of the so-called solubility parameter (SP value) can be a measure. The preferred ranges for the solubility parameters of these compounds are from 8.50 to 11.50 for the aromatic and halogenated aromatic hydrocarbons and from 7.00 to 11.00 for the ether, ketone and ester compounds. More preferably, the ether compounds should have a value of the solubility parameter in the range from 7.00 to 10.00 and the ketone and ester compounds should have a value of the solubility parameter in the range from 8.00 to 10.00.

Exemplary of these compounds, the number in the brackets after each name of the compounds being the value of the solubility parameter of the compound, are benzene (9.2), toluene (8.9), xylene (9.0), ethylbenzene (8.8), diethylbenzene (9.4), isopropylbenzene (8.5), p-cymene (8.5), amyl benzene (8.63) and the like as the examples of the aromatic hydrocarbons, chlorobenzene (9.5), dichlorobenzene (10.6), bromobenzene (10.2), chlorotoluene (9.7) and the like as the examples of the halogenated aromatic hydrocarbons, ethyl ether (7.74), dichloroethyl ether (10.49), isopropyl ether (7.00), isoamyl ether (7.44), epichlorohydrin (8.09), n-butyl ether (8.37), 1,4-dioxane (9.73), trioxane (7.91), furan (7.08), tetrahydrofuran (9.32), 2-methyl furan (7.09), tetrahydropyran (7.52), methylal (7.83), methyl phenyl ether (9.37), ethyl phenyl ether (9.10), ethyl benzyl ether (8.95) and the like as the examples of the ether compounds, acetone (9.71), methyl ethyl ketone (9.08), methyl n-propyl ketone (9.98), methyl n-butyl ketone (9.92), methyl isobutyl ketone (8.62), ethyl n-butyl ketone (9.56), di-n-propyl ketone (8.88), methyl n-amyl ketone (8.89), methyl n-hexyl ketone (8.74), diisobutyl ketone (8.23) and the like as the examples of the ketone compounds and methyl formate (9.91), ethyl formate (9.16), propyl formate (8.93), n-butyl formate (9.16), isobutyl formate (8.75), amyl formate (8.75), methyl acetate (9.29), ethyl acetate (9.04), n-propyl acetate (8.68), isopropyl acetate (8.35), n-butyl acetate (8.28), n-amyl acetate (8.58), isoamyl acetate (8.33), dibutyl oxalate (9.01) and the like as the examples of the ester compounds. These compounds may of course be used either singly or as a combination of two kinds or more according to desire.

The weight ratio of the components (i) and (ii) in the volatilizable blowing agent as well as the total amount of the blowing agent to be used in the inventive method should be determined in consideration of various parameters such as the type and degree of polymerization of the vinyl chloride-based resin, types and amounts of the additive ingredients in the resin composition, desired ratio of expansion and desired cellular structure, e.g. fineness, of the foamed body and others. In view of the functions of the components (i) and (ii) in the foaming of the resin composition that the component (i) serves as a main blowing agent by vaporization when the resin composition impregnated with the blowing agent is brought under a reduced pressure as in the extrusion out of an extruder machine to give a uniformized cellular structure as well as to decrease the temperature of the foamed body by taking a latent heat by the vaporization and that the component (ii) serves principally to decrease and stabilize the pressure required for the pressurized impregnation of the blowing agent into the resin composition as well as to accelerate the dispersion of the blowing agent into the resin composition as a consequence of the decreased melt viscosity of the resin composition, for example, in the mixing zone of the extruder machine, the amount of the component (ii) is usually in the range from 1 to 50 parts by weight or, preferably, from 5 to 30 parts by weight per 100 parts by weight of the component (i). Further, the amount of the volatilizable blowing agent composed of the component (i) and (ii) to be used for impregnating the resin composition is preferably in the range from 1 to 30 parts by weight per 100 parts by weight of the resin composition.

The method of the present invention is most conveniently practiced by use of an extruder machine in the following manner. Thus, the vinyl chloride-based resin is first blended with various kinds of additives according to need, such as stabilizers, lubricants, fillers and the like, in a suitable blending machine such as a supermixer to give a resin composition which is supplied continuously into an extruder machine. When the resin composition is heated and has arrived at an appropriate temperature in the extruder, the volatilizable blowing agent composed of the components (i) and (ii) as described above is pressurized continuously into the extruder in the middle way of the cylinder at a calculated rate so as to impregnate the resin composition therewith. The resin composition thus impregnated with the volatilizable blowing agent is kneaded in the melting and mixing zone of the cylinder so that the blowing agent is uniformly dispersed into the melt of the resin composition which is then cooled uniformly to a somewhat decreased temperature suitable for extrusion and extruded out of the extruder through the die under atmospheric or reduced pressure where the resin composition is expanded with foaming by the vaporization of the blowing agent into a desired expanded form.

The volatilizable blowing agent may be introduced into the extruder at any time before complete melting of the resin composition provided that the backward flow of the blowing agent toward the feeding port of the resin composition and disturbance of the feed rate of the resin composition thereby can be avoided. In particular, the best moment for the impregnation of the resin composition with the pressurized volatilizable blowing agent in the extruder is when the resin composition is at a state of at least partly or completely gelled mass by heating in the extruder because the impregnation of the resin composition with the blowing agent is facilitated to give a uniform dispersion of the blowing agent in the resin composition when pressurization of the blowing agent is performed at such a moment so that the foamed body of the resin composition obtained thereby may have a larger ratio of expansion and further improved uniformity of the cellular structure.

The vinyl chloride-based resins suitable for use in the inventive method as the main ingredient in the resin composition are not limited to homopolymeric vinyl chloride resins but include various copolymers mainly composed of vinyl chloride in an amount of, for example, 50% by weight or more as well as graft copolymers and polymer blends of which the main constituent is the above mentioned homo- or copolymeric vinyl chloride resin.

The comonomers to be copolymerized with vinyl chloride monomer for the above mentioned copolymeric vinyl chloride resins are exemplified by vinyl esters such as vinyl acetate and the like, vinylidene chloride, acrylic and methacrylic acids as well as esters thereof, acrylonitrile, methacrylonitrile, maleic acid and esters and anhydride thereof, fumaric acid and esters thereof, olefins such as ethylene and propylene, vinyl ethers and the like. It is of course optional that two kinds or more of these comonomers are combined simultaneously with the vinyl chloride monomer as the main monomeric component. The polymeric materials to be blended with a vinyl chloride resin in the above mentioned polymer blends, which of course should have good compatibility with the vinyl chloride resin, are exemplified by polyvinylidene chloride, copolymers of ethylene and vinyl acetate, ABS resins, MBS resins and chlorinated polyethylenes as well as synthetic rubbers such as NBR, SBR and the like.

The resin composition used in the method of the present invention is formulated mainly of a vinyl chloride-based resin admixed with various kinds of known additives. In addition, the resin composition in a preferred formulation should contain a cell uniformizing aid selected from heat-decomposable blowing agents and high-melting finely pulverized materials in an amount of at least 0.01 part by weight per 100 parts by weight of the vinyl chloride-based resin when a finer or more uniformly controlled cellular structure is desired in the resultant foamed body. Furthermore, the addition of from 0.5 to 30 parts by weight, per 100 parts by weight of the resin, of an acrylic resin or a styrene-based resin is effective in accelerating or adequately controlling the gelation of the vinyl chloride-based resin or in increasing or adequately controlling the melt viscosity of the resin when the resin composition is still at an elevated temperature with an object to prevent coalescence or shrinking of the foam cells. It is of course optional that the resin composition is admixed with conventional additives used in the fabrication of vinyl chloride-based resins including stabilizers, lubricants, fillers and the like according to need provided that no substantially detrimental effects are caused thereby.

The above mentioned acrylic resins and styrene-based resins are expected to accelerate the uniform gelation of the vinyl chloride-based resin and to adequately increase the melt viscosity of the resin whereby to impart rubbery elasticity to the resin and to improve the strength and elongation, i.e. extendability, of the resin foams at high temperatures. In order to fully achieve the above object, the acrylic and styrene-based resins should have a sufficiently high degree of polymerization such that the reduced viscosity of a chloroform solution thereof in a concentration of 0.1 g/100 ml is at least 3.0 dl/g at 20° C. and higher than the degree of polymerization of the vinyl chloride-based resin so that coalescence and shrinking of the foam cells can be effectively prevented.

In consideration of the compatibility with the vinyl chloride-based resin, suitable acrylic resins are exemplified by polymethyl methacrylate and copolymers of an acrylic ester with methyl methacrylate as the main monomeric constituent without or together with other comonomers copolymerizable with these monomers. Suitable styrene-based resins are exemplified by copolymers of styrene and one or more of copolymerizable monomers such as esters of acrylic, methacrylic, maleic and fumaric acids, of which the main monomeric component is styrene. It is recommended that the acrylic or styrene-based resins should have a higher degree of polymerization when the vinyl chloride-based resin as the main ingredient of the resin composition has a higher degree of polymerization.

Exemplary of the heat-decomposable blowing agents which may be admixed in the resin composition in the inventive method are azoic compounds known as a blowing agent such as azodicarbonamide, azobisisobutyronitrile, diazoaminobenzene, diethylazodicarboxylate, diisopropyl azodicarboxylate and the like, nitroso compounds such as N,N'-dinitrosopentamethylene tetramine, N,N'-dimethyl-N,N'-dinitrosoterephthal amide and the like and sulfonium hydrazide compounds such as benzene sulfonyl hydrazide, toluene sulfonyl hydrazide, 3,3'-disulfonehydrazidophenyl sulfone, toluene disulfonyl hydrazone, thiobis(benzene sulfonyl hydrazide), toluene sulfonyl azide, toluene sulfonyl semicarbazide, 4,4'-hydroxybis(benzene sulfonyl hydrazide) and the like as well as combinations of a carbonate or hydrogencarbonate of sodium, potassium or ammonium and an organic or inorganic acid such as citric acid, tartaric acid, oxalic acid, boric acid and the like.

The high-melting, finely divided powdery materials are exemplified by calcium carbonate, talc, barium sulfate, fumed silica, titanium dioxide, clay, aluminum oxide, bentonite, diatomaceous earth and carbon black as well as pigments, high-melting stabilizers and flame retardants and the like.

In accordance with the above described method of the present invention, in particular, by use of an extruder machine, various forms, e.g. plate-like, sheet-like, rod-like or tubular forms, of shaped bodies of a vinyl chloride-based foamed resin having an outstandingly fine and uniform cellular structure can be obtained in a continuous process with markedly decreased costs.

Following is an example including experiments both in accordance with the inventive method and in accordance with conventional procedures undertaken for comparative purpose. In the experiments, a number of volatilizable organic compounds were used as a component of the organic blowing agent and these compounds are given by the respective abridgements in the tables showing the formulation and results of the experiments. The abridgements for the compounds are as shown below in the alphabetical order.

AAC: n-amyl acetate
ACT: acetone
AFM: n-amyl formate
AMB: amyl benzene
BTN: butane
CLF: chloroform
DBO: dibutyl oxalate
DCF: dichlorodifluoromethane
DFE: difluoroethane
DOX: 1,4-dioxane
DPB: dipropyl benzene
EBK: ethyl n-butyl ketone
ECH: epichlorohydrin
EDC: ethylidene chloride
EET: ethyl ether
ETB: ethyl benzene
IAE: isoamyl ether
IHN: isohexane
IPA: isopropyl acetate
MBK: methyl isobutyl ketone
MEK: methyl ethyl ketone
MFR: 2-methyl furan
MLC: methyl chloride
MNC: methylene chloride
NDN: n-decane
NHE: n-hexyl ether
NHN: n-hexane
NOC: n-octane
NPA: n-propyl acetate
PPN: propane
PTN: n-pentane
TCB: 1,2,4-trichlorobenzene
TCE: trichloroethylene
TCF: trichloromonofluoroethane
TCM: carbon tetrachloride
TFM: tetrafluoromethane
THF: tetrahydrofuran
THP: tetrahydropyran
TLN: toluene
XLN: xylene

EXAMPLE

Vinyl chloride-based resin compositions were prepared each by uniformly blending in a supermixer 100 parts by weight of a polyvinyl chloride resin having a degree of polymerization as indicated in the tables below, 2 parts by weight of a lead-containing stabilizer, 1 part by weight of calcium stearate, 3 parts by weight of talc, 0.5 part by weight of an azodicarbonamide compound having a decomposition temperature of 130°-180° C. (Celmic 133 manufactured by Sankyo Kasei Co.) and 10 parts by weight of an acrylic resin which was a copolymer of 80% by weight of methyl methacrylate and 20% by weight of n-butyl acrylate and had a reduced viscosity of 11.5 dl/g as measured in a 0.1 g/100 ml chloroform solution at 20° C.

The thus obtained resin composition was supplied to the first of two tandem-connected extruder machines as described below with impregnation of the organic blowing agent of a composition as indicated in the tables and extruded to be expanded by foaming in a manner described below.

The first extruder having a diameter of 50 mm and an L/D value of 30 was provided with a feeding port for the volatilizable organic blowing agent at the middle way of the cylinder into which the blowing agent could be introduced by pressurizing with a double-plunger pump at a pressure and a feeding rate indicated in the tables. The second extruder connected to the exit end of the first extruder had a diameter of 65 mm and an L/D value of 28 and a slit-like die of 4 mm thickness and 450 mm width was mounted on the exit end thereof. The resin composition was supplied to the first extruder at a rate of 35 to 40 kg/hour and the velocities of the first and second extruders were 50 r.p.m. and 15-18 r.p.m., respectively. The head pressure of the first extruder and the pressure at the die of the second extruder are shown in the tables. The temperature at each part of the extruders was controlled at a temperature within the range for each of the experiments.

Cylinder temperature of the first extruder:
1C (first-stage feeding-compression zone): 90°-120° C.
2C (first-stage compression-metering zone): 120°-180° C.
3C (second-stage feeding-compression zone): 150°-170° C.
4C (second-stage compression-metering zone): 150°-170° C.
Temperature of the connecting duct: 150°-170° C.
Cylinder temperature of the second extruder:
1C (first-stage feeding-compression zone): 145°-160° C.
2C (first-stage compression-metering zone): 135°-150° C.
3C (second-stage feeding-compression zone): 125°-140° C.
Temperature at the die: 120°-135° C.

Following tables give the bulk density of each of the thus obtained plate-like foamed bodies of the vinyl chloride-based resin compositions and evaluation thereof in respect of the fineness and uniformity of the cellular structure. The results of this cell evaluation were given in two grades of A and B according to the following criteria.

A: Substantially all of the cells have a diameter of 1.0 mm or smaller and the cellular structure is fine and uniform with good acceptable appearance.

B: Many of the cells have a diameter larger than 1.0 mm and the cellular structure is coarse and non-uniform so that the foamed body is not acceptable as a commercial product.

(c) melting and mixing the resin composition to effect uniform dispersion of the blowing agent therein, and (d) bringing the resin composition thus impregnated with the blowing agent under a reduced pressure so as to expand the resin composition by the volatilization of the blowing agent.

TABLE

| Exp. No. | $\bar{P}$ of the resin | Blowing agent Composition (weight ratio) | Feed rate, kg/hr. | Feed pressure, kg/cm² | Head pressure of first extruder, kg/cm² | Pressure at die, kg/cm² | Foamed body Density, g/cm³ | Cell condition |
|---|---|---|---|---|---|---|---|---|
| 1 | 500 | TCF 8 + BTN 2 + TLN 1 | 5.3 | 103–108 | 89–92 | 82–87 | 0.041–0.043 | A |
| 2 | 710 | " | 3.8 | 107–112 | 69–75 | 90–95 | 0.060–0.066 | A |
| 3 | 820 | " | 4.6 | 110–114 | 69–74 | 98–107 | 0.053–0.055 | A |
| 4 | 980 | " | 4.7 | 108–110 | 85–89 | 85–89 | 0.050–0.055 | A |
| 5 | 1280 | " | 4.9 | 105–108 | 70–79 | 92–99 | 0.058–0.060 | A |
| 6 | 820 | TCF 9 + BTN 1 + XLN 0.4 | 5.1 | 110–116 | 80–85 | 93–100 | 0.055–0.059 | A |
| 7 | 980 | BTN 9 + PPN 1 + TLN 4 | 4.0 | 107–113 | 79–83 | 82–86 | 0.047–0.052 | A |
| 8 | 710 | BTN 5 + TCF 5 + ETB 2 | 9.7 | 112–118 | 83–89 | 78–81 | 0.031–0.058 | A |
| 9 | 980 | BTN 2 + MNC 6 + MLC 2 + AMB 2.5 | 3.1 | 92–101 | 92–97 | 112–118 | 0.085–0.091 | A |
| 10 | 820 | TCF 8 + BTN 2 | 3.7 | 223–284 | 123–157 | 32–52 | 0.042–0.085 | B |
| 11 | 710 | TCF 8 + BTN 2 + XLN 0.05 | 4.2 | 212–291 | 116–142 | 30–61 | 0.039–0.078 | B |
| 12 | 1010 | TCF 7 + BTN 3 + TLN 7 | 5.1 | 90–97 | 108–113 | 115–122 | 0.091–0.103 | B |
| 13 | 980 | MNC 6 + BTN 2 + MLC 2 + DPB 4 | 4.1 | 92–101 | 111–118 | 125–130 | 0.103–0.112 | B |
| 14 | 710 | MLC 7 + TCF 3 + TCB 3 | 5.1 | 95–108 | 97–110 | 128–140 | 0.109–0.121 | B |
| 15 | 980 | MLC 2 + PPN 8 + TLN 0.03 | 9.5 | 271–315 | 75–125 | 25–81 | 0.031–0.113 | B |
| 16 | 500 | NOC 8 + PPN 2 + ETB 2 | 4.3 | 105–113 | 125–131 | 131–142 | 0.113–0.182 | B |
| 17 | 710 | BTN 3 + TCF 7 + THF 2 | 4.8 | 106–114 | 92–97 | 80–85 | 0.035–0.038 | A |
| 18 | 980 | PPN 2 + BTN 2 + MNC + DOX 0.03 | 5.1 | 110–115 | 80–85 | 98–107 | 0.031–0.038 | A |
| 19 | 1280 | MLC 3 + TCE 7 + ECH 4.5 | 4.9 | 98–102 | 88–97 | 94–100 | 0.040–0.045 | A |
| 20 | 820 | BTN 2 + TCF 8 + THF 3 | 11.5 | 115–121 | 103–108 | 70–75 | 0.027–0.031 | A |
| 21 | 1280 | PTN 3 + TCM 7 + EET 1 + MFR 2 | 2.2 | 81–86 | 100–106 | 101–108 | 0.045–0.047 | A |
| 22 | 980 | BTN 10 + THF 4 | 3.9 | 105–110 | 83–88 | 96–99 | 0.030–0.033 | A |
| 23 | 1280 | BTN 3 + CHF 5 + THF 1 | 3.1 | 105–113 | 98–108 | 100–105 | 0.028–0.030 | A |
| 24 | 1010 | BTN 5 + CLF 5 | 4.6 | 220–281 | 131–156 | 35–54 | 0.035–0.079 | B |
| 25 | 710 | MLC 5 + TCM 5 + LAE 0.02 | 5.3 | 208–283 | 121–147 | 35–69 | 0.034–0.082 | B |
| 26 | 1280 | PPN 1 + BTN 1 + TFM 8 + THF 7 | 5.4 | 81–88 | 123–138 | 125–135 | 0.081–0.115 | B |
| 27 | 500 | DPN 8 + BTN 2 + DOX 2 | 3.3 | 90–93 | 125–131 | 135–144 | 0.113–0.175 | B |
| 28 | 820 | NHN 5 + TCE 5 + NHE 3 | 4.2 | 57–71 | 126–135 | 127–131 | 0.100–0.125 | B |
| 29 | 1280 | BTN 2 + MLC 2 + MNC 6 + THP 0.03 | 10.1 | 125–138 | 71–130 | 21–30 | 0.025–0.135 | B |
| 30 | 710 | PPN 3 + TCM 7 + ACT 2 | 4.3 | 90–93 | 93–97 | 85–92 | 0.033–0.035 | A |
| 31 | 1280 | BTN 2 + CLF 8 + MEK 0.3 | 5.3 | 105–107 | 87–96 | 83–89 | 0.032–0.034 | A |
| 32 | 980 | PTN 3 + MNC 7 + MBK 2 + ACT 2 | 4.4 | 92–97 | 95–101 | 95–107 | 0.043–0.047 | A |
| 33 | 820 | BTN 3 + TCF 7 + AFM 1 + EBK 1 | 4.2 | 95–100 | 92–100 | 82–88 | 0.031–0.032 | A |
| 34 | 1280 | PTN 1 + NHN 2 + DFE 7 + NPA 2 | 10.7 | 118–124 | 108–114 | 69–75 | 0.028–0.033 | A |
| 35 | 500 | PPN 2 + BTN 2 + MNC 6 + MEK 3 | 2.1 | 87–91 | 83–85 | 93–96 | 0.035–0.041 | A |
| 36 | 500 | BTN 3 + TCM 7 + IPA 0.03 | 4.1 | 253–287 | 145–191 | 35–95 | 0.028–0.090 | B |
| 37 | 1280 | PTN 2 + IHN 3 + MNC 5 + AAC 5 | 5.6 | 72–81 | 106–113 | 102–119 | 0.095–0.108 | B |
| 38 | 980 | NDN 7 + NDN 3 + ACT 2 | 5.3 | 58–68 | 95–105 | 131–140 | 0.133–0.185 | B |
| 39 | 710 | BTN 2 + NHN 3 + EDC 5 + DBO 2 | 4.7 | 65–68 | 93–98 | 125–149 | 0.113–0.120 | B |
| 40 | 980 | BTN 3 + DCF 7 + MEK 0.04 | 11.2 | 285–311 | 65–141 | 39–91 | 0.030–0.116 | B |

What is claimed is:

1. A method for the preparation of a foamed body of a vinyl chloride-based resin composition which comprises the steps of
   (a) heating a resin composition mainly composed of a vinyl chloride-based resin,
   (b) impregnating the thus heated resin composition with a binary volatilizable blowing agent composed of
      (i) at least one kind of first volatilizable organic compounds selected from the group consisting of aliphatic hydrocarbons and halogenated aliphatic hydrocarbons having a boiling point not higher than 90° C., and
      (ii) at least one kind of second volatilizable organic compounds selected from the group consisting of aromatic hydrocarbons, halogenated aromatic hydrocarbons, ethers, ketones and esters having compatibility with the vinyl chloride-based resin, under pressurization, 2. The method as claimed in claim 1 wherein the steps (a) to (c) are performed in an extruder machine and the step (d) is performed by extruding the resin composition impregnated with the blowing agent out of the extruder machine through a die.

3. The method as claimed in claim 1 wherein the first volatilizable organic compound as the component (i) of the binary volatilizable blowing agent has a boiling point not higher than 70° C.

4. The method as claimed in claim 1 wherein the second volatilizable organic compound as the component (ii) of the binary volatilizable blowing agent has a boiling point not higher than 200° C.

5. The method as claimed in claim 4 wherein the boiling point of the component (ii) is not higher than 150° C.

6. The method as claimed in claim 1 wherein the aromatic hydrocarbon or halogenated aromatic hydrocarbon has a solubility parameter in the range from 8.50 to 11.50.

7. The method as claimed in claim 1 wherein the ether, ketone or ester has a solubility parameter in the range from 7.00 to 11.00.

8. The method as claimed in claim 7 wherein the ether has a solubility parameter in the range from 7.00 to 10.00.

9. The method as claimed in claim 7 wherein the ketone or ester has a solubility parameter in the range from 8.00 to 10.00.

10. The method as claimed in claim 1 wherein the component (ii) of the volatilizable blowing agent is used in an amount from 1 to 50 parts by weight per 100 parts by weight of the component (i).

11. The method as claimed in claim 10 wherein the component (ii) is used in an amount from 5 to 30 parts by weight per 100 parts by weight of the component (i).

12. The method as claimed in claim 1 wherein the binary volatilizable blowing agent is used in an amount from 1 to 30 parts by weight per 100 parts by weight of the resin composition.

* * * * *